INVENTOR:
NATHAN GILBERT
BY
ATTORNEY

United States Patent Office 3,107,184
Patented Oct. 15, 1963

3,107,184
SENSOR APPARATUS FOR PRIMARY
BATTERY SYSTEM
Nathan Gilbert, Fair Lawn, N.J., assignor, by mesne assignments, to the United States of America as represented by the Secretary of the Navy
Filed May 16, 1962, Ser. No. 196,563
2 Claims. (Cl. 136—83)

This invention relates to a primary battery system and is particularly concerned with such a system which is capable of delivering electrical energy continuously and at high rates by the efficient transformation of chemical energy into electrical energy.

It is known that electrical energy may be provided by the use of dry cells or storage batteries and while these elements have marked utility for certain purposes, they are deficient as sources of large reserve power without replacement or recharging. Primary battery cells are also known which employ, for example, zinc or similar metals as electrodes and a stationary body of fluid electrolyte but these have been found to provide inefficient operation because of low current production. In battery systems which use a stationary electrolyte, the by-products of the chemical reactions by which the electrical energy is obtained accumulate in the cell or system and result in the delivery of progressively decreasing amounts of electrical energy. Fuel cells have been proposed to supplant the conventional primary battery cells but these have generally been found to have practical defects and have gone into only limited experimental use or use in limited environments.

The primary battery system with which the present invention is concerned is described in Chemical Engineering Progress, vol. 57, February 1961, at pages 140 and 141. The system disclosed therein is particularly adapted for submarine use and is designed primarily to supplement the main power system and supply the power required for the auxiliary equipment and it may be used to supply power for propulsion of the vessel. The various reactants used in the instant battery system are supplied in a generally continuous manner and replenished as necessary in order that the output of electrical energy will be maintained substantially constant and the system operated at or near maximum efficiency. The battery system for which the present invention is especially adapted involves the use of group of a selected number of fuel cells, depending on the electrical output required, which are connected as desired in series or in series parallel and to which are supplied the reactants comprising an alkali metal such as sodium and an oxidant such as oxygen or air and sea water which provides the electrolyte for the system.

Since certain alkali metals, such as sodium, will form an explosive mixture with the sea water electrolyte, the system contemplates admitting the selected metal in the state or form of an amalgam to the cells. Preparation of the amalgam of the desired or necessary concentration for use in a continuous system presents a problem in that it has been found difficult to intimately mix the metal with mercury and therefore particularly difficult to provide an amalgam of the desired concentration. A substantially complete and intimate mixture of the metal and mercury is necessary since the mercury, in effect, functions primarily as a carrier for the metal and the metal content of the amalgam for the present battery system must be maintained at an extremely low value.

The problem of obtaining a sodium amalgam for use in the present battery system is more complex than simply adding sodium to mercury since the sodium concentration must be of a precise value and, additionally, the amalgam must be very pure and free of the formation of oxides. These oxides are insoluble in the amalgam and will form deposits on the cell plates and other cell surfaces which present operating difficulties.

The broad object of the present invention is to provide an amalgam containing an alkali metal for use in a primary battery system.

Another object is to provide for the controlled supply of alkali metal to an amalgam to maintain the amalgam at desired metal concentration for use in a primary battery system.

Still another object is to regenerate amalgam of reduced alkali metal concentration by utilizing sensor apparatus for adding alkali metal thereto in accordance with the rate of depletion of the alkali metal in a primary battery system.

And another object is to provide sensor apparatus for providing a potential difference between a standard amalgam and amalgam of reduced concentration and regulating the supply of alkali metal to raise the amalgam of reduced concentration to that of the standard.

Other objects will become apparent from a more detailed understanding of the invention.

Figure 1:
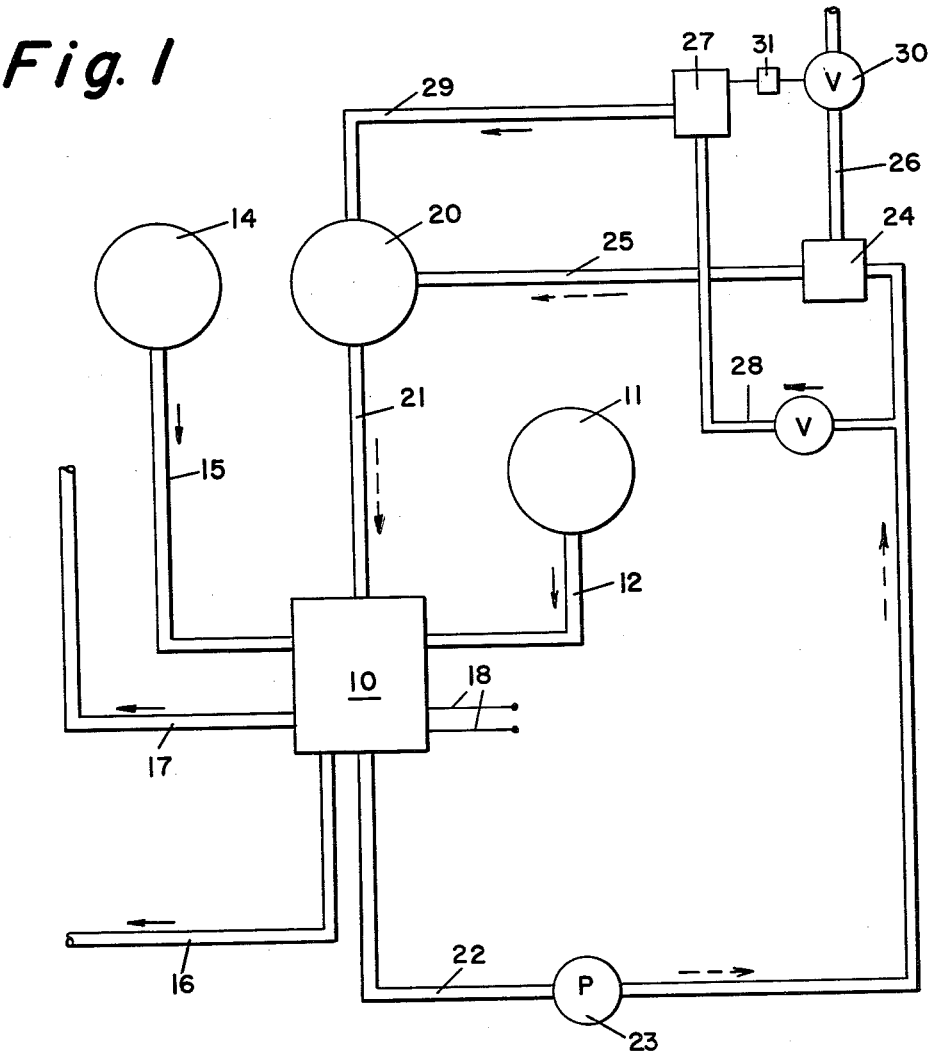
FIG. 1 is a flow diagram of a primary battery system showing the present invention located therein.

Referring to FIG. 1, it will be understood that the elements of the primary battery system shown therein will be arranged within a submarine in a manner to occupy a minimum of space and this factor and such other factors as roll and pitch of the submarine must be considered in the structural design of the elements in order to insure proper operation of the system.

The group of battery cells is indicated at 10, the source of electrolyte is indicated at 11 and in this battery system the electrolyte is preferably sea water which is supplied to the cell group 10 by line 12 while an oxidant source is indicated at 14 and may be oxygen or air which is supplied to the cell group 10 by line 15. The amalgam circuit of the battery system is indicated by the arrowed broken lines and will be described in detail later. As indicated by the arrowed broken line circuit, the amalgam is recirculated through the cell group 10 and as the reaction takes place therein used sea water and other waste will be removed by line 16, inert gases from the cell group will be removed by line 17 and the electrical energy will be taken off, for example, by leads 18.

Although the invention is applicable to other alkali metals, particularly those having a melting point of upwardly of 210° F., the following detailed description will be confined to the use of sodium.

Referring to the broken line amalgam circuit of FIG. 1, 20 indicates a source or vessel for the sodium amalgam which is supplied to the system at the desired sodium concentration, for example, 0.5 percent sodium concentration. The amalgam is directed by line 21 to the cell group 10, removed at reduced sodium concentration by line 22 and fed by pump 23 to an amalgamator or regenerator zone 24 from which it is sent at the desired sodium concentration by line 25 back to the source or vessel 20 for recirculation. Sodium is supplied to the amalgamator or regenerator zone 24 in controlled amounts by line 26 through means of a sensor apparatus diagrammatically indicated at 27 and which is shown in detail in FIG. 2. For this purpose, a branch conduit 28 communicates with the line 22, as shown, for removing a sample of the amalgam which is then delivered to the sensor 27 and sent from the sensor 27 to the vessel 20 by line 29 for reuse in the system. A valve 30 is provided in the sodium inlet conduit 26 and a controller 31 actuates the valve 30 through the operation of sensor 27 which will be explained in detail in the description of FIG. 2.

The amalgam delivered by conduit 28 to the sensor apparatus 27 is at lowered sodium concentration than the amalgam supplied to the cells from the amalgam source, being in the neighborhood of 0.2 percent and must be regenerated by the addition of sodium before being sent back through the cell group at the desired sodium concentration of about 0.5 percent.

Figure 2:
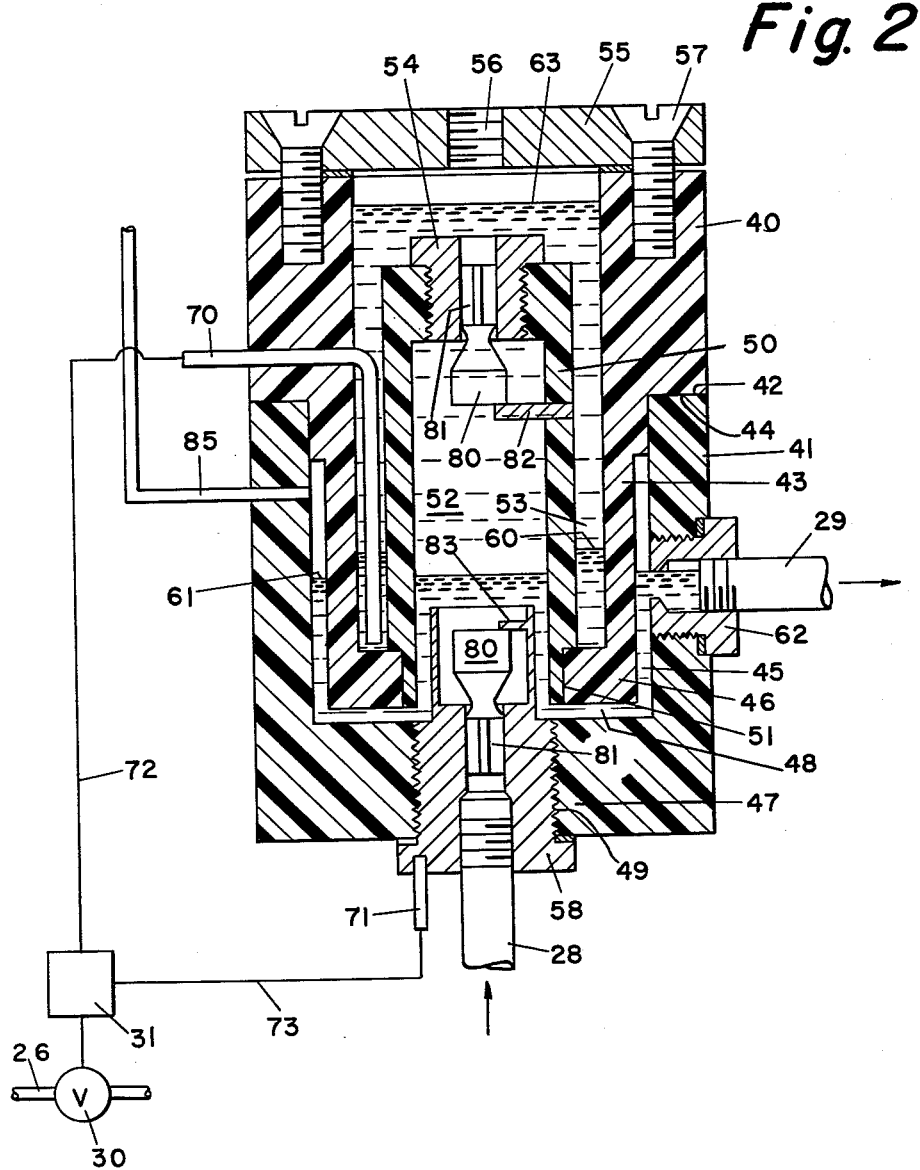
FIG. 2 is a view in sectional elevation of the sensor apparatus of the invention showing its details of structure.

The sensor apparatus of FIG. 2 is designed to provide one compartment for a body of the standard amalgam of the desired concentration of substantially 0.5 percent sodium while another compartment is provided for a body of depleted amalgam of reduced concentration and these compartments are so arranged that the amalgam bodies are bridged or interconnected by an electrolyte such as NaOH and cause the amalgam bodies to function as electrodes whereby a difference in potential is created which actuates the valve 30 through the controller 31.

The particular sensor apparatus shown in FIG. 2 consists of upper and lower cylindrical housing sections indicated at 40 and 41 respectively. The upper section is constructed to form a shoulder 42 and provide therebelow a reduced diameter skirt 43 and the sections interfit with the upper edge 44 of the lower section abutting the shoulder 42 to form the housing. The outer diameter of the skirt 43 is less than the inner diameter of the lower section 41 providing an outer annular space or compartment 45 and the skirt at its lower end is provided with an inwardly extending flange 46 while the lower section 41 is provided with a cooperating inwardly extending flange 47. These flanges are separated as shown to provide therebetween a lower transverse space 48 which provides communication with the annular space 45 while the flange 47 of the lower housing section forms a central aperture 49 and the flange 46 forms a central aperture 51 aligned therewith.

A cylinder 50 has its lower open end fixed in the aperture 51 formed by the flange 46 of the upper housing section and provides a central chamber 52 and forms an inner annular space 53 which is disposed between the central chamber 52 and the outer annular space 45. A fitting 54 is screwthreadedly mounted in the upper end of cylinder 50 and a cover 55 having a central aperture 56 is secured to the upper end of housing section 40 by screw means 57 providing for the supply of amalgam and electrolyte to central chamber 52 and annular space 53. Also, the central aperture 49 is provided with another fitting 58 providing for the supply of another amalgam to the central chamber 52 and communicating spaces 48 and 45 by sample line 28.

A standard amalgam, for example, an amalgam of 0.5 percent sodium is supplied to the inner annular chamber 53 in a volume to attain a level such as that indicated at 60 while the sample amalgam from line 28 enters the central space 52 through the fitting 58, passes to the communicating lower space 48 and the outer annular space 45 and attains a level indicated at 61 in both of spaces 52 and 45. This level is regulated by another fitting 62 which is screwthreadedly mounted in the lower housing section 40 and conduit 29 is secured therein to transmit the sample amalgam to the vessel 20 as explained in connection with FIG. 1. An electrolyte such as NaOH is admitted by opening 56 to the central space 52 and inner annular space 53 and attains some suitable level such as indicated at 63.

The amalgam bodies in the central chamber 52 and the inner annular space 53 have higher densities than the electrolyte and they will be bridged by the electrolyte but since the amalgam bodies contain different concentrations of alkali metal they will have different electrical potentials. Consequently the valve 30 in the metal or sodium supply line 26 can be regulated in accordance with this potential difference through a suitable controller 31. To this end one terminal 70 is placed in conducting relation with the body of standard amalgam in the annular space 53 and another terminal 71 is conveniently connected to the fitting 58 to place it in conducting relation with the sample amalgam in spaces 48 and 52 and the terminals are in turn connected to controller 31 by leads 72 and 73 for operating the metal or sodium supply valve 30.

It is essential to the invention that the amalgam bodies be maintained at substantially the same temperatures since the sensor output will vary in accordance with temperature changes of the amalgam bodies. This is accomplished by the above described sensor apparatus since it provides for circulation of the sample amalgam around the standard amalgam in space 53. Also, in order to maintain the sensor apparatus operative under pressure changes in the system, an upper float valve is provided in fitting 54 and a lower similar float valve is provided in fitting 58. Each float valve is formed of a plug section 80 and a guide section 81. The plug section 80 of the upper float valve extends into the body of electrolyte and is limited in its opening movement by abutment 82 to maintain its guide 81 within the fitting 54. The plug section 80 of the lower float valve extends into the body of amalgam and is limited in its opening movement by abutment 83 to maintain its guide 81 within the fitting 49. In the case of pressure surges in conduit 28, the upper float valve will prevent the incoming amalgam from forcing the electrolyte out of space 52 and the amalgam from entering space 53 since the plug 80 will close the passageway in fitting 54 under the increased pressure. In the case of decreased pressure in line 28 the lower float valve will move to closing position in the passageway in fitting 58 and maintain the electrolyte at substantially the level indicated at 61. Additionally, a vent 85 is provided for annular compartment 45 to prevent siphoning of the electrolyte through space 52 and the compartment 45.

It is a requisite of the invention that the bodies of amalgam be separated by electrically non-conductive material and for this purpose the upper and lower sections 40 and 41 and the cylinder 50 are preferably formed of a suitable plastic material. In order to electrically conduct from the bodies of amalgam, it is further essential that the fitting 58 be formed of suitable conducting material since the terminal 71 is connected thereto and also that the terminal 70 be formed of conducting material such as a suitable metal.

Although the levels of the standard amalgam and the amalgam of reduced alkali metal concentration are shown at different heights in the sensor apparatus, these relative levels are not critical but show one arrangement for maintaining the amalgam bodies at substantially the same temperature.

I claim:

1. In a primary battery system wherein standard amalgam of predetermined alkali metal concentration from a source is supplied to a fuel cell for producing electrical energy and depleted amalgam is removed from the fuel cell and sent to a regeneration zone for receiving added alkali metal, the improvement in apparatus for supplying the added alkali metal which comprises a sensor formed of complemental upper and lower cylindrical housing sections each having an open upper end and a centrally apertured lower end, said upper section having a lower skirt portion extending into the lower section providing an outer annular space with the lower section side wall and a communicating transverse space with the bottom wall of the lower section, a cylindrical partition mounted concentrically of the upper section having an open lower end secured in the central aperture of the bottom wall of the upper section, said partition providing a central chamber and forming with the side wall of the upper section an inner annular chamber having a closed lower end and an open upper end for supplying a body of standard amalgam thereto, said central aperture of the lower housing section providing for the supply of depleted amalgam to the central chamber and a conduit in communication with the outer annular space providing for the maintenance of a body of depleted amalgam in the central chamber, the transverse passageway and the outer annular chamber, said cylindrical partition having an upper open end disposed below the upper open end of the upper housing section forming therewith an upper space, said upper space communicating with the central chamber and also the inner annular chamber providing with said chambers a zone for a body of electrolyte which bridges both the body of standard amalgam and the body of depleted amalgam and develops a potential difference therebetween, an alkali metal supply conduit communicating with the regeneration zone, a valve in said conduit, a controller for said valve, a first terminal in electrical conducting relation with the body of standard amalgam, a second terminal in electrical conducting relation with the body of depleted amalgam and each of said terminals being connected to said controller for operating said valve in accordance with the potential difference between the bodies of amalgam.

2. The improvement as set forth in claim 1, further characterized by valve means in the upper open end of the central chamber which is operative to prevent the depleted amalgam from moving upwardly of the central chamber and intermixing with the standard amalgam in the inner annular chamber under increased pressure conditions in the supply of the depleted amalgam and other valve means in the centrally apertured lower end of the lower housing which is operative to prevent movement of the depleted amalgam from the central chamber downwardly through the centrally apertured lower end of the lower housing under reduced pressure conditions in the supply of the depleted amalgam.

References Cited in the file of this patent

UNITED STATES PATENTS 1,528,076  Rodman et al. ........... Mar. 3, 1925
2,844,532  White .................. July 22, 1958

OTHER REFERENCES

Status Report on Fuel Cells, U.S. Dept. Comm., OTS PB151804, June 1959, pp. 68–69.